United States Patent [19]
Niimura et al.

[11] Patent Number: 5,746,790
[45] Date of Patent: May 5, 1998

[54] TRAP FOR COLLECTING SOLID

[75] Inventors: Yasuhiro Niimura, Ayase; Tetsuma Ikegami, Kawasaki; Naoya Hanafusa, Yokohama; Masaru Nakaniwa, Ebina, all of Japan

[73] Assignee: Ebara Corporation, Tokyo, Japan

[21] Appl. No.: 696,228

[22] Filed: Aug. 13, 1996

[30] Foreign Application Priority Data

Aug. 14, 1995 [JP] Japan ................... 7-228515

[51] Int. Cl.⁶ .................. B01D 45/16; B01D 45/18
[52] U.S. Cl. .................. 55/317; 55/435; 55/436; 55/456; 55/473
[58] Field of Search ................... 55/262, 435, 436, 55/456, 457, 317, 473; 219/121; 239/591

[56] References Cited

U.S. PATENT DOCUMENTS

| | | | |
|---|---|---|---|
| 3,633,343 | 1/1972 | Mark | 55/316 |
| 3,690,567 | 9/1972 | Borneman | 239/591 |
| 3,805,495 | 4/1974 | Steel | 55/435 |
| 3,813,854 | 6/1974 | Hortman | 55/399 |
| 4,189,310 | 2/1980 | Hotta | 55/317 |
| 5,154,743 | 10/1992 | Takato et al. | 55/473 |
| 5,173,041 | 12/1992 | Niimura et al. | |
| 5,562,758 | 10/1996 | Awaji | 55/317 |

FOREIGN PATENT DOCUMENTS

| | | |
|---|---|---|
| 33 33 898 | 4/1985 | Germany. |
| 6-26462 | 2/1994 | Japan. |

OTHER PUBLICATIONS

Patent Abstracts of Japan, vol. 014, No. 232, May 17, 1990, JP-A-02 059002, Feb. 28, 1990.

Primary Examiner—Robert Spitzer
Attorney, Agent, or Firm—Oblon, Spivak, McClelland, Maier & Neustadt, P.C.

[57] ABSTRACT

A trap for collecting solid is connected to either an exhaust port or a suction port of a vacuum pump for trapping a solid material separated from a sublimed gas discharged by the vacuum pump. The trap includes a casing, a passage defining member disposed in the casing and defining a gas passage in the casing, and an intermediate member disposed between the casing and the passage defining member. The intermediate member is made of a flat thin sheet which is formed into a tubular member, and the tubular member is capable of being spread when taken out from the casing.

7 Claims, 6 Drawing Sheets

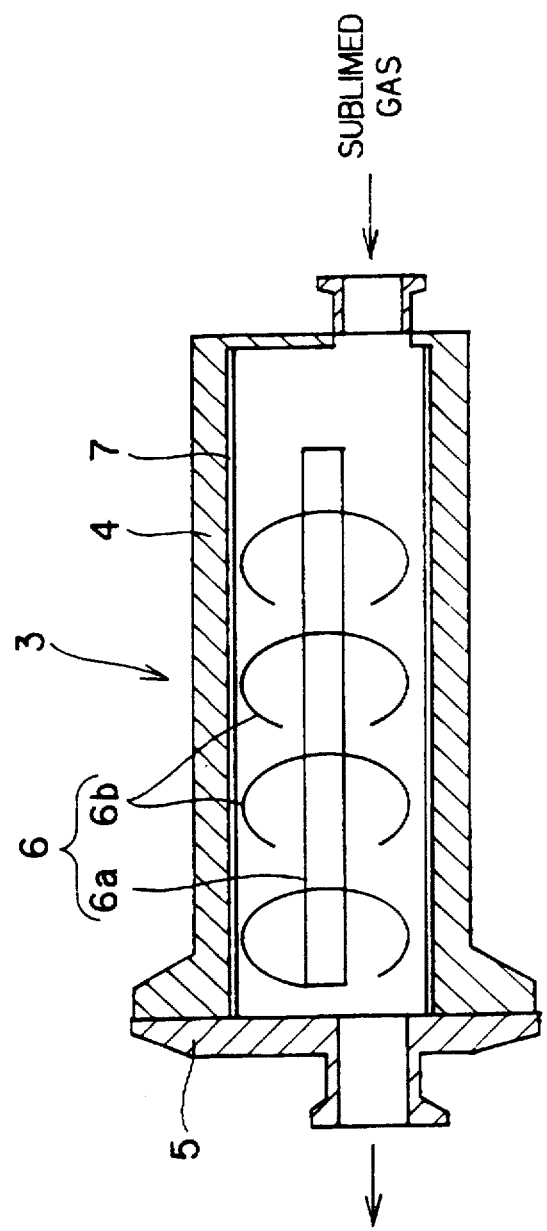

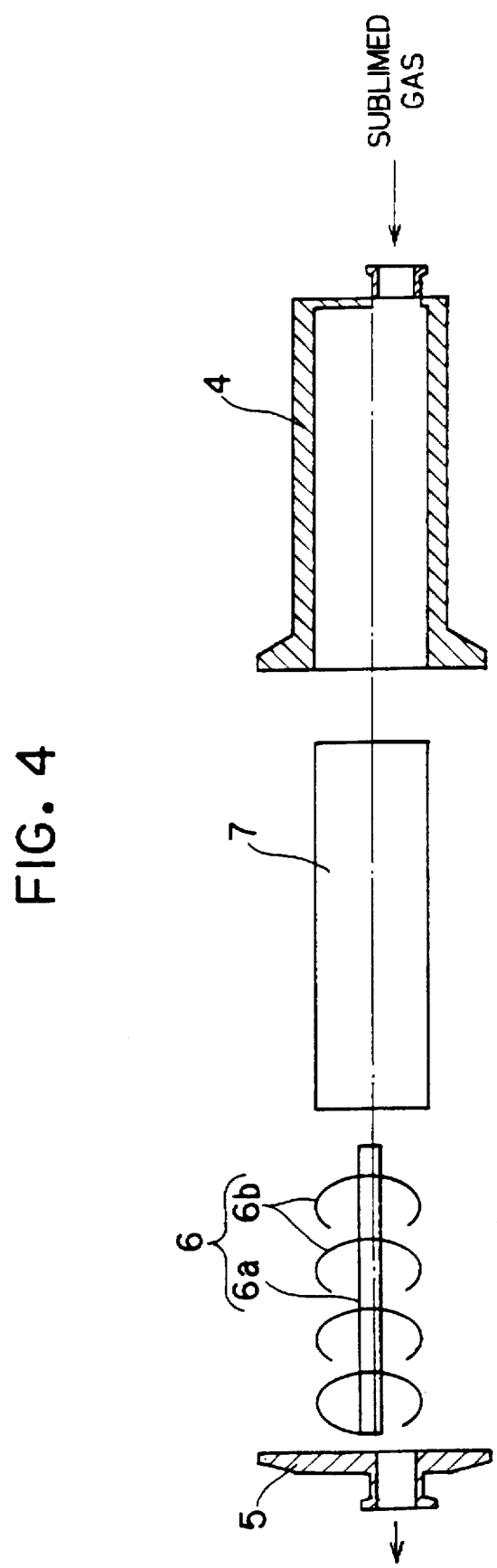

TRAP FOR COLLECTING SOLID

BACKGROUND OF THE INVENTION

1. Field of the Invention

The present invention relates to a trap for collecting solid, and more particularly to a trap for collecting solid which is connected to an exhaust port or a suction port of a pump for handling a sublimed gas that produces a solid material depending on pressure and temperature changes.

2. Description of the Related Art

When a sublimed gas is compressed by a pump and discharged from the pump, the sublimed gas has a high temperature and a high pressure. Sublimed gases have such properties that they separate out a solid material when the pressure remains constant but the temperature is lowered. Since the sublimed gas discharged from the pump is cooled by ambient air around the pipe connected to the pump, a solid material is separated out of the discharged gas and tends to adhere to the pipe. The pipe is thus clogged with the solid material in a relatively short period of time.

In order to prevent the pipe from being clogged, a trap for collecting solid is used for efficiently separating out the solid material from the sublimed gas and collecting most of the separated solid material. The trap for collecting solid comprises a casing and a passage defining member disposed in the casing. When a large amount of trapped solid material is accumulated in the trap, the trap needs to be serviced to remove the collected solid material. However, because the collected solid material is solidified between the casing and the passage defining member, the passage defining member cannot be taken out of the casing, and hence the trap cannot easily be serviced for maintenance.

SUMMARY OF THE INVENTION

It is therefore an object of the present invention to provide a trap for collecting solid which has an intermediate member disposed between a casing and a passage defining member and made of a thin sheet which is formed into a tubular member, for preventing the casing and the passage defining member from sticking to each other due to a solid material separated out of a sublimed gas flowing through the trap, and allowing the intermediate member and the passage defining member from being easily detached from each other.

Another object of the present invention is to provide a pump apparatus having a vacuum pump and a trap for collecting solid.

To achieve the above objects, according to the present invention, there is provided a trap for collecting solid separated from a sublimed gas, comprising: a casing; a passage defining member disposed in the casing and defining a gas passage in the casing; and an intermediate member disposed between the casing and the passage defining member, the intermediate member being made of a flat thin sheet which is formed into a tubular member; wherein the tubular member is capable of being spread when taken out from the casing.

According to the present invention, there is also provided a vacuum pump apparatus comprising: a vacuum pump; and a trap for collecting solid which is provided at one of an exhaust side and a suction side of the vacuum pump; the trap comprising: a casing; a passage defining member disposed in the casing and defining a gas passage in the casing; and an intermediate member disposed between the casing and the passage defining member, the intermediate member being made of a flat thin sheet which is formed into a tubular member; wherein the tubular member is capable of being spread when taken out from the casing.

According to the present invention, the intermediate member made of a flat thin sheet which is formed into a tubular member is provided between the casing and the passage defining member. Therefore, the intermediate member prevents the sublimed gas from entering between the intermediate member and the casing. Therefore, because a solid material is practically non-existent between the casing and the intermediate member, solidification does not occur therebetween, but occurs between the passage defining member and the intermediate member. As a result, the intermediate member and the casing do not stick to each other, and the intermediate member allows the passage defining member to be easily taken out of the casing for maintenance. When the passage defining member is taken out of the casing, the intermediate member and the passage defining member are easily removed from the casing. When removed from the casing, the intermediate member is capable of being spread because the intermediate member is made of a flat thin sheet which is formed into a tubular member, and the passage defining member can be easily detached from the intermediate member. Consequently, the trap for collecting solid can easily be serviced for maintenance.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a longitudinal cross-sectional view of a trap for collecting solid according to a first embodiment of the present invention;

FIG. 4 is an exploded cross-sectional view of the trap shown in FIG. 3;

DETAILED DESCRIPTION OF THE PREFERRED EMBODIMENTS

An embodiment of a trap for collecting solid of the present invention will be described below with reference to drawings.

Figure 1A:
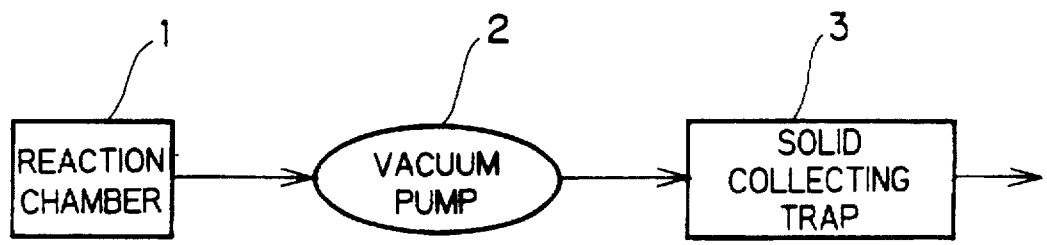
FIG. 1A is a block diagram of an exhaust system which incorporates a trap for collecting solid according to the present invention.
Figure 1B:
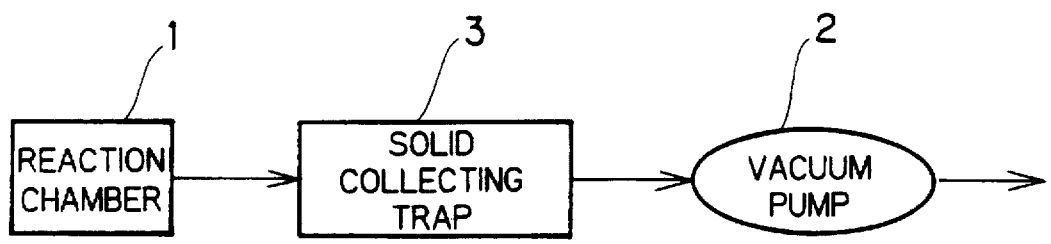
FIG. 1B is a block diagram of another exhaust system which incorporates a trap for collecting solid according to the present invention.

FIG. 1A shows in a block diagram an exhaust system which incorporates a trap for collecting solid. The exhaust system includes a vacuum pump 2 for evacuating a reaction chamber 1 in a semiconductor fabrication apparatus. The vacuum pump 2 has a discharge port connected to a trap 3 for collecting solid (hereinafter referred to as a solid collecting trap 3). The reaction chamber 1 contains gases including a sublimed gas. Those gases are discharged from the reaction chamber 1 by the vacuum pump 2, and flow from the vacuum pump 2 into the solid collecting trap 3.

Figure 7A:
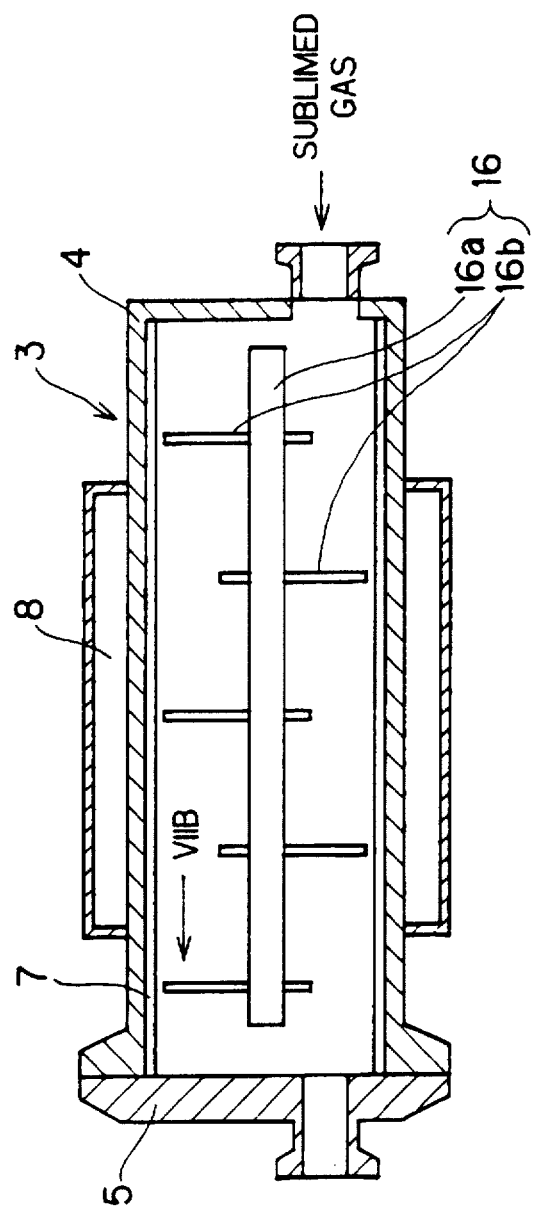
FIG. 7A is a cross-sectional view of a trap for collecting solid according to a second embodiment of the present invention.
Figure 7B:
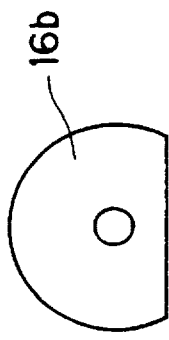
FIG. 7B is a view as viewed in the direction indicated by the arrow VIIB in FIG. 7A.

FIG. 7B shows in a block diagram another exhaust system which incorporates a solid collecting trap. In the exhaust system, gases including a sublimed gas are discharged from a reaction chamber 1 through a solid collecting trap 3 by a vacuum pump 2. The solid collecting trap 3 is positioned in between the reaction chamber 1 and the vacuum pump 2 in accordance with the properties of the sublimed gas.

Figure 2:
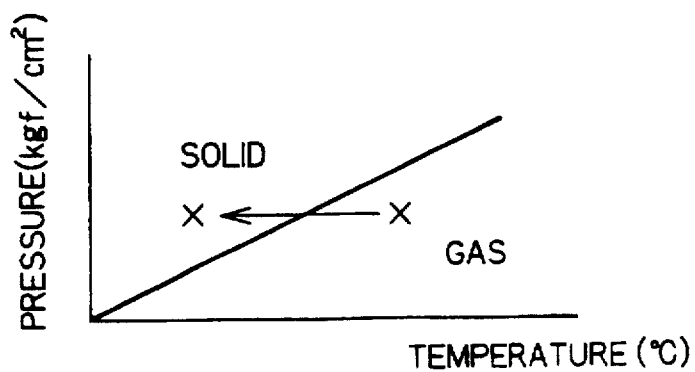
FIG. 2 is a phase diagram of a sublimed gas which is processed by a trap for collecting solid.

FIG. 2 is a phase diagram of a sublimed gas which is processed by a solid collecting trap 3. In FIG. 2, a horizontal axis represents the temperature (°C.) of the sublimed gas, and a vertical axis represents the pressure (kgf/cm$^2$) of the sublimed gas.

The gases including the sublimed gas are discharged from the reaction chamber 1 which is evacuated by the vacuum pump 2 and has an internal pressure lower than the atmospheric pressure. The discharged gases are compressed to the atmospheric pressure or heated to a certain temperature by the vacuum pump 2. When the gases flow through the solid collecting trap 3, the sublimed gas is cooled across the transformation line in FIG. 2, and separates out a solid material which is collected by the solid collecting trap 3.

FIGS. 3 and 4 show a solid collecting trap 3 according to a first embodiment of the present invention. As shown in FIGS. 3 and 4, the solid collecting trap 3 comprises a cylindrical casing 4, a lid 5 for closing an open end of the casing 4, and a passage defining member 6 disposed in the casing 4 and defining a gas passage in the casing 4. The passage defining member 6 comprises a central support rod 6a and a helical member 6b supported by the central support rod 6a.

The solid collecting trap 3 also has an intermediate member 7 disposed between the casing 4 and the passage defining member 6. The intermediate member 7 is made of a flat thin sheet which is formed into a tubular member. The intermediate member 7 is preferably made of stainless steel, but may be any of various other materials insofar as it is elastic and can be formed into a tubular shape.

Figure 5A:
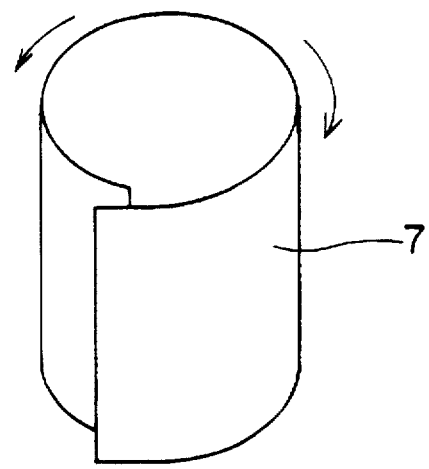
FIG. 5A is a perspective view of an intermediate member which is formed into a tubular member for being mounted in a casing of the trap shown in FIG. 3.

As shown in FIG. 5A, the thin sheet is formed into the tubular intermediate member 7 against its own elasticity when it is mounted in the casing 4 and placed between the casing 4 and the passage defining member 6.

Figure 5B:
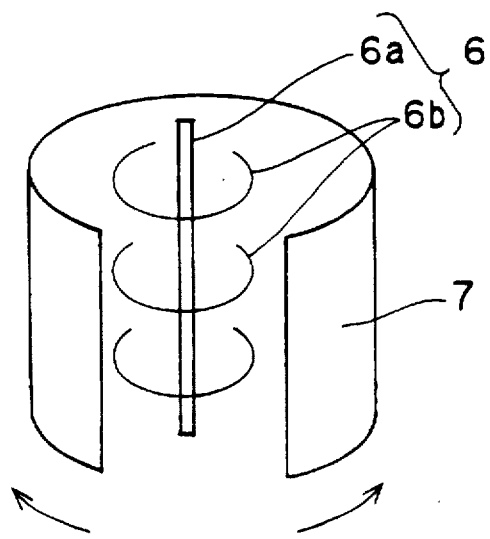
FIG. 5B is a perspective view of the intermediate member which is expanded after removal from the casing of the trap shown in FIG. 3.

As shown in FIG. 5B, when the tubular intermediate member 7 is removed from the casing 4, the tubular intermediate member 7 can be spread for maintenance by applying forces to both end portions of the member 7, and hence can easily be separated from the passage defining member 6.

When the tubular intermediate member 7 is disposed in the casing 4, the tubular intermediate member 7 tends to spread under the elastic forces exerted by the original flat thin sheet. Therefore, the tubular intermediate member 7 is held in intimate contact with the casing 4, and prevents the sublimed gas from entering between the tubular intermediate member 7 and the casing 4. As a result, the tubular intermediate member 7 and the casing 4 do not stick to each other, and the tubular intermediate member 7 allows the passage defining member 6 to be easily taken out of the casing 4. Since the tubular intermediate member 7 and the passage defining member 6 stick to each other due to a solid material separated out of the sublimed gas flowing through the solid collecting trap 3, the passage defining member 6 would not easily be detached from the tubular intermediate member 7 if the tubular intermediate member 7 remained tubular in shape. However, since the tubular intermediate member 7 can be actually spread by applying forces to both end portions of the member 7 when it is taken out from the casing 4, the passage defining member 6 can easily be detached from the intermediate member 7. Consequently, the solid collecting trap 3 can easily be serviced for maintenance.

Figure 6:
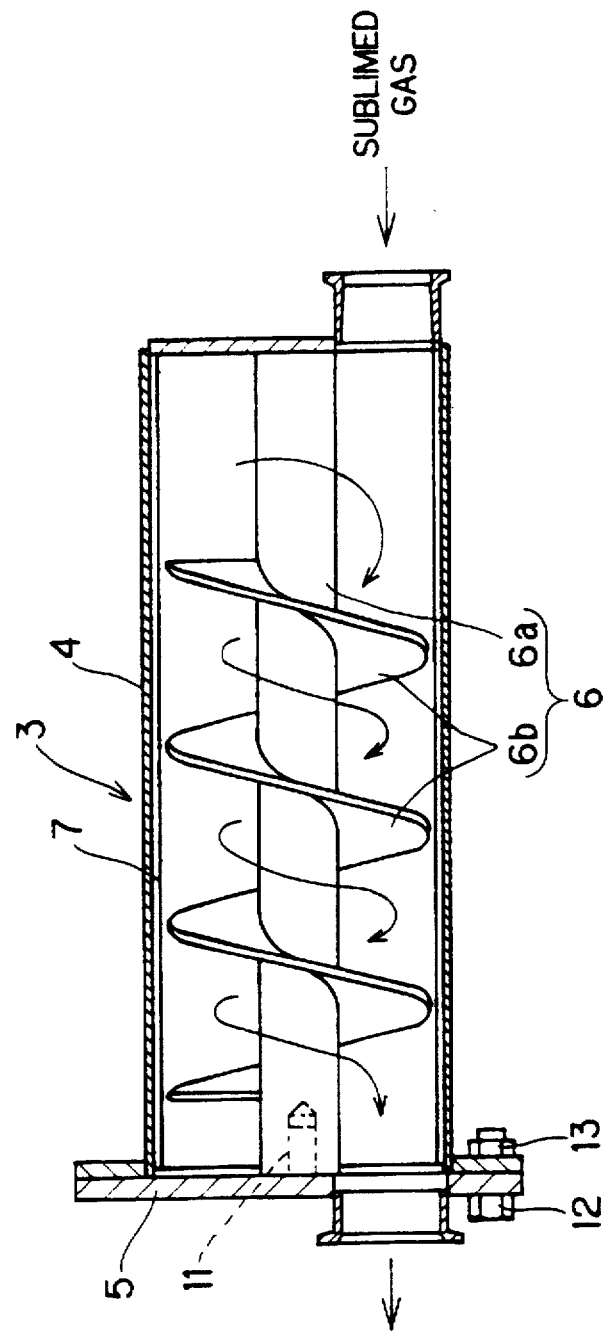
FIG. 6 is a detailed cross-sectional view of the trap shown in FIG. 3.

FIG. 6 shows the solid collecting trap 3 in greater detail. As shown in FIG. 6, the solid collecting trap 3 comprises a casing 4, a lid 5 for closing an open end of the casing 4, and a passage defining member 6 disposed in the casing 4. The passage defining member 6 comprises a central support rod 6a and a helical member 6b supported by the central support rod 6a. The solid collecting trap 3 also has an intermediate member 7 which is interposed between the casing 4 and the passage defining member 6. The intermediate member 7 is made of a flat thin sheet which is formed into a tubular member. The central support rod 6a has one end fixed to the lid 5 by a pin 11. The lid 5 is fixed to an end flange of the casing 4 by bolts 12 and nuts 13.

FIG. 7A and 7B show a solid collecting trap 3 according to a second embodiment of the present invention. As shown in FIG. 7A, the solid collecting trap 3 comprises a tubular casing 4, a lid 5 for closing an open end of the casing 4, and a passage defining member 16 disposed in the casing 4. The passage defining member 16 comprises a central support rod 16a and a plurality of axially spaced plates 16b mounted on the central support rod 16a and extending radially transversely to the central support rod 16a. As shown in FIG. 7B, each of the plates 16b comprises a disk with a segmental end cut off.

As shown in FIG. 7A, the solid collecting trap 3 also has a cylindrical cooling jacket 8 disposed around the casing 4 for holding cooling water therein. When cooling water is supplied to the cylindrical cooling jacket 8, the casing 4 is cooled to collect a more solid material separated out of a sublimed gas flowing through the solid collecting trap 3.

As is apparent from the above description, according to the present invention, an intermediate member is interposed between a casing and a passage defining member, and the intermediate member is made of a flat thin sheet which is formed into a tubular member. When the tubular intermediate member is mounted in the casing, the tubular intermediate member tends to spread under the elastic forces exerted by the original flat thin sheet. Therefore, the tubular intermediate member is held in intimate contact with the casing, and prevents the sublimed gas from entering between the tubular intermediate member and the casing. As a result, the tubular intermediate member and the casing do not stick to each other, and the tubular intermediate member allows the passage defining member to be easily taken out of the casing.

Since the tubular intermediate member and the passage defining member stick to each other due to a solid material separated out of the sublimed gas flowing through the solid collecting trap, the passage defining member would not easily be detached from the tubular intermediate member if the tubular intermediate member remained tubular in shape. However, since the tubular intermediate member is actually spread by applying forces when it is taken out from the casing, the passage defining member can easily be detached from the tubular intermediate member. Consequently, the solid collecting trap can easily be serviced for maintenance.

Although certain preferred embodiments of the present invention have been shown and described in detail, it should be understood that various changes and modifications may be made therein without departing from the scope of the appended claims.

What is claimed is:

1. A trap for collecting solid separated from a sublimed gas, comprising:

a casing;

a passage defining member removably disposed in said casing and defining a gas passage in said casing; and an intermediate member disposed between said casing and said passage defining member, said intermediate member being made of a flat thin sheet which is formed into a tubular member;

wherein said tubular member has a tendency to spread when taken out from said casing, wherein said passage defining member is removable from the casing together with said tubular member and is subsequently separable therefrom by spreading said tubular member for cleaning each of said passage defining member and said tubular member separately.

2. A trap for collecting solid according to claim 1, wherein said intermediate member is made of stainless steel.

3. A trap for collecting solid according to claim 1, wherein said flat thin sheet formed into a tubular member has a tendency to elastically return to a flat shape.

4. A trap for collecting solid according to claim 3, wherein said intermediate member is made of stainless steel.

5. A vacuum pump apparatus comprising:

a vacuum pump; and a trap for collecting solid which is provided at one of an exhaust side and a suction side of said vacuum pump;

said trap comprising:

a casing;

a passage defining member removably disposed in said casing and defining a gas passage in said casing; and an intermediate member disposed between said casing and said passage defining member, said intermediate member being made of a flat thin sheet which is formed into a tubular member;

wherein said tubular member has a tendency to spread when taken out from said casing, wherein said passage defining member is removable from the casing together with said tubular member and is subsequently separable therefrom by spreading said tubular member for cleaning each of said passage defining member and said tubular member separately.

6. A vacuum pump apparatus according to claim 5, wherein said intermediate member is made of stainless steel.

7. A vacuum pump according to claim 5, wherein said flat thin sheet formed into a tubular member has a tendency to elastically return to a flat shape.

* * * * *